A. A. OILAR.
AUTOMOBILE TIRE PROTECTOR.
APPLICATION FILED JUNE 20, 1910.
993,710.
Patented May 30, 1911.
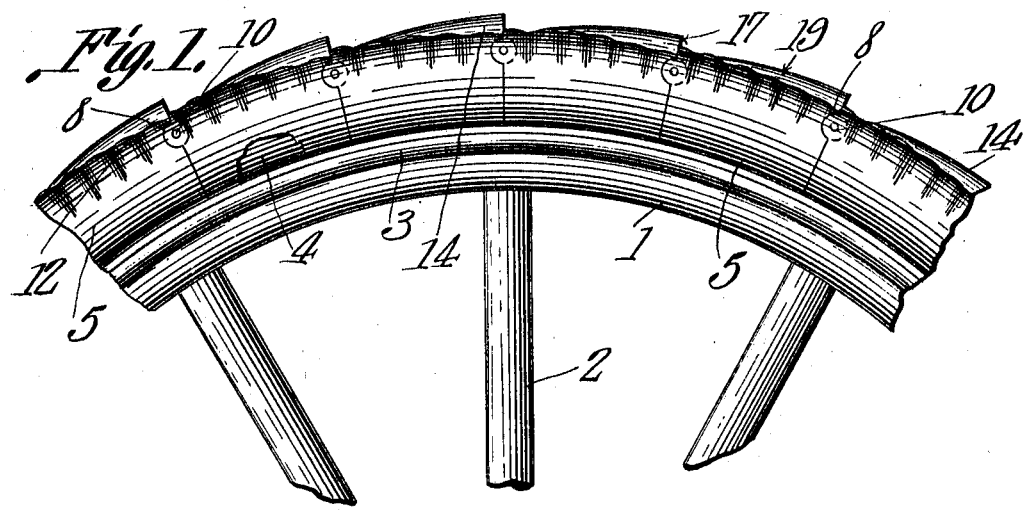
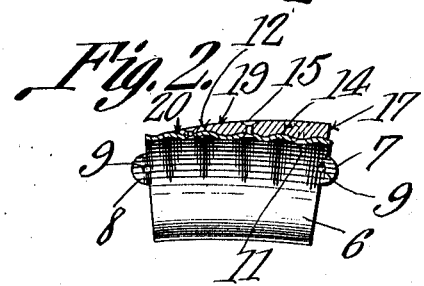
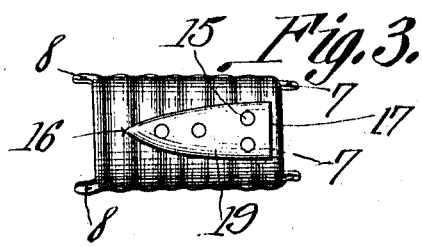
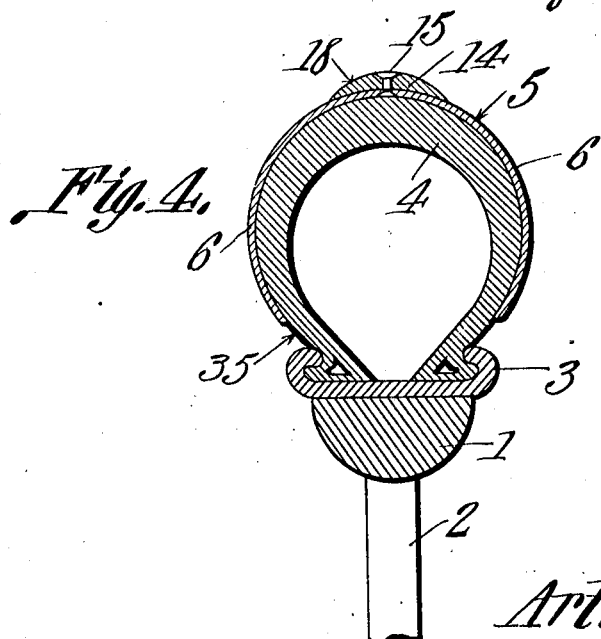
Witnesses
Arthur A. Oilar,
Inventor
by C. A. Snow & Co.
Attorneys

UNITED STATES PATENT OFFICE.

ARTHUR A. OILAR, OF PITTVILLE, CALIFORNIA.

AUTOMOBILE TIRE-PROTECTOR.

993,710.          Specification of Letters Patent.     Patented May 30, 1911.

Application filed June 20, 1910. Serial No. 567,940.

*To all whom it may concern:*

Be it known that I, ARTHUR A. OILAR, a citizen of the United States, residing at Pittville, in the county of Lassen and State of California, have invented a new and useful Automobile Tire-Protector, of which the following is a specification.

It is the object of this invention to provide, in a simple, merchantable and inexpensive form, a shield adapted to be mounted upon a vehicle tire, to prevent the same from injury, and to provide an antislipping surface upon the wheel of which the tire is a component part.

Another object of the invention is to provide a tire shield which may readily be mounted upon and removed from the tire which is protected thereby, the device being so constructed that it may be removed from the tire only when the tire is deflated, the inflation of the tire serving to hold the shield in place thereon.

Another object of the invention is to provide a grip piece of novel and improved form, and to provide means whereby the grip piece may be made to interlock with the section upon which it is mounted; the grip piece being so constructed that, although thoroughly adequate to prevent the wheel from slipping, it will nevertheless permit the wheel to be rotated in contact with the ground, without undue jar.

The drawings show typical embodiments merely, and it is to be understood, that changes properly falling within the scope of what is claimed, can be made without departing from the spirit of the invention.

In the accompanying drawings,—Figure 1 is a fragmental side elevation of a wheel equipped with the device of my invention; Fig. 2 is a longitudinal section of one of the elements which go to make up the shield, showing the grip piece mounted thereon; Fig. 3 is a top plan of one of the elements which go to make up the shield; and Fig. 4 is a transverse section of a wheel, the tire of which is partially inclosed by the device of my invention.

In the accompanying drawings, the felly of the wheel is denoted by the numeral 1, the spokes by the numeral 2, and the rim by the numeral 3. The rim 3 carries the tire 4, which may be of any desired construction. In the present instance, a simple clencher structure is shown, although, obviously, the device may be used upon tires of any sort.

The device proper comprises a plurality of pivotally connected sections 5, the same being trough-like in general outline, as seen most clearly in Fig. 4. The side walls 6 of the sections 5 are extended downwardly around the tire 4, to a point well below the axis thereof. The lower edges of the side walls 6 of the sections 5 are spaced apart by a distance considerably less than the diameter of the tire 4; and by reason thereof, the shield may be put upon the tire only when the tire is deflated. When the tire is inflated, the tire will serve to hold the shield securely in place, without the use of springs, or attaching devices of any sort.

Outstanding from the ends of the side walls 6, are oppositely disposed ears 7 and 8. Those ears 8 which are located at one end of the section, are spaced more widely apart than those ears 7 which are located at the other end thereof, the construction being such that the ears 7 at the end of a given section, may be inserted between the ears 8 and the next adjoining section. In the several ears 7 and 8, there are openings 9 adapted to be brought into alinement, and to receive rivets 10, or like retaining elements, whereby the sections 5 may be pivotally connected with each other.

The sections are corrugated transversely, thus forming upon the interior of the sections, ribs 11, adapted to engage the tire 4, to prevent the shield, as an entity, from slipping upon the tire longitudinally of the same. The transverse corrugations in the sections 5 form transverse ribs 12 upon the exterior of the said sections.

Grip pieces 14 are provided, and, as seen most clearly in Fig. 2 of the drawings, these grip pieces are corrugated transversely upon their lower faces, to interlock with the ribs 12 of the sections 5, so that the grip pieces will be held in place against slipping longitudinally of the sections upon which they are mounted. As a primary securing means, and to prevent the grip pieces 14, from slipping transversely of the sections 5, rivets 15, or like securing elements, are extended through the grip pieces, and through the sections. These grip pieces 14 are pointed at one end, as denoted by the numeral 16, the remote end faces being disposed substantially normal to the outer surfaces of the sections 5 upon which the grip pieces are mounted; the end faces being denoted by the numeral 17. As seen most clearly in Fig. 4, the outer face of the grip piece 14 is rounded transversely, as shown at 18. Moreover this outer face is inclined from the end face 17 of the grip piece, toward the section 5, as seen in Fig. 2, and there denoted by the numeral 19. By referring still to Fig. 2, it will be seen that the inclined outer face 19 of the grip piece 14 terminates flush with one of the transverse ribs 12 of the section 5, as seen at 20.

In practical operation, the tire is deflated and the shield is sprung about the tire. When the tire is inflated, the shield will be held securely in place, as seen in Fig. 4. The sections 5 will, owing to their pivotal connection, yield sufficiently so that the resiliency of the tire 4 will in nowise be impaired. Obviously, the end faces 17 of the grip pieces 14 will prevent the wheel from slipping, even upon a frosted or frozen ground. By reason of the fact that the outer face of the grip piece is curved transversely, as denoted by the numeral 18, and by reason of the further fact that said outer face is inclined as denoted by the numeral 19, the grip piece, although affording a firm hold, will cause no jar or concussion, when the wheel moves in contact with the ground. By reason of the further fact that, as shown at 20, the inclined face 19 of the grip piece terminates substantially flush with one of the outer ribs 12 of the section 5, there will be no jar when the point of contact between the wheel and the ground passes from the inclined face 19 of the grip piece 14, onto the exterior surface of the section 5 proper. Owing to the fact that the grip piece 14 is pointed, as shown at 16, the bearing area between the section 5 and the surface of the earth will increase gradually, thus lessening materially the jar, and promoting both the comfort of the occupants of the vehicle, and the wearing qualities of the shield structure. By reason of the fact that the sections 5 are spaced apart from the rim 3 as shown at 35, the tire 4 will be permitted to give, without bringing the edges of the side walls 6 into contact with the rim, a contingency tending obviously to injure the contacting parts and to destroy the resiliency of the tire.

Having thus described the invention, what is claimed is:

In a device of the class described, a yieldable shield, transversely corrugated to define a plurality of ribs upon the outer face thereof; grip pieces placed along the shield in spaced relation, and having corrugations to engage with the ribs; means for securing the grip pieces upon the shield; each grip piece presenting an end face substantially normal to the shield and being tapered to a point at the other end, which point is lodged behind one of the ribs flush therewith; the outer faces of the grip pieces being inclined from the end faces to the points, and being transversely curved, away from the shield.

In testimony that I claim the foregoing as my own, I have hereto affixed my signature in the presence of two witnesses.

ARTHUR A. OILAR.

Witnesses:
J. L. Moss,
Gladys Rose.